Nov. 8, 1966  D. GIACOSA  3,283,866
FRICTION CLUTCH CONTROL DEVICE FOR MOTOR VEHICLES
Filed Oct. 12, 1964  2 Sheets-Sheet 1

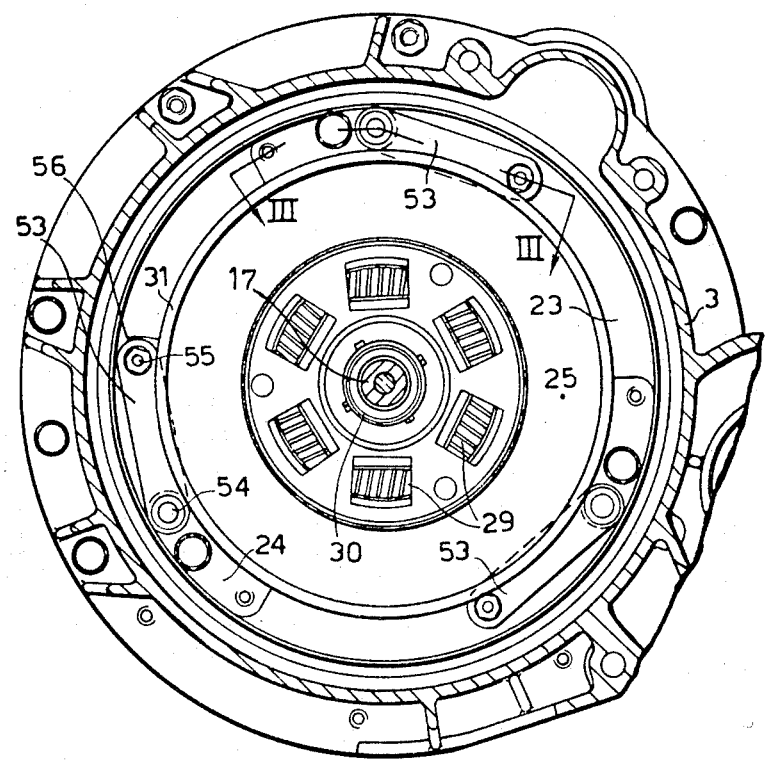
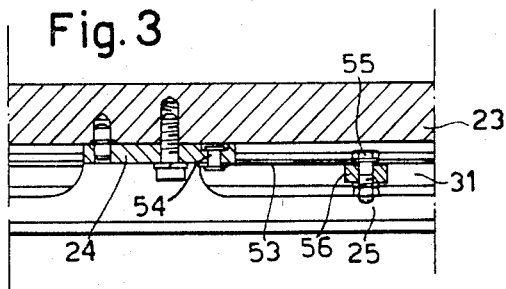

United States Patent Office 3,283,866
Patented Nov. 8, 1966

3,283,866
FRICTION CLUTCH CONTROL DEVICE FOR MOTOR VEHICLES
Dante Giacosa, Agnelli, Turin, Italy, assignor to Fiat Società per Azioni, Turin, Italy
Filed Oct. 12, 1964, Ser. No. 403,079
Claims priority, application Italy, Oct. 15, 1963, 21,602/63
1 Claim. (Cl. 192—96)

This invention relates to improvements in friction clutch control device, more particularly for motor vehicles equipped with a gearbox of the type having a primary shaft adapted to be coupled with a drive shaft through the said friction clutch and a secondary shaft coupled with the power transmission to the vehicle driven wheels.

The clutch is of known type comprising a flywheel with a cover acting as a driving member and a friction plate acting as a driven member, pressed by a disc spring against the driving member.

This invention provides a clutch of the abovementioned type with a simple control device, affording a ready and reliable operation of the clutch and of considerably reduced axial length with respect to the clutches provided with known control devices.

With the above and further objects in view this invention provides control device for a friction clutch, more particularly for motor vehicles equipped with a gearbox having a primary shaft adapted to be coupled with the motor shaft through a friction coupling and a secondary shaft coupled with the power transmission to the vehicle driven wheels, the said friction clutch comprising a flywheel keyed to the motor shaft, provided with a cover fixed to the flywheel, a friction plate mounted for axial displacement on the primary shaft in juxtaposition to the said cover, a clutch pressure plate juxtaposed to the friction plate, capable of axial displacement in the cover and a disc spring interposed between the flywheel and clutch pressure plate to press the latter against the friction plate, having the characteristic feature that the control means for clutching in and declutching the friction plate comprises a rod mounted for axial displacement in an axial bore in the primary shaft and abutting by one end against the disc spring, the axial displacements of the said rod being controlled by means arranged externally of the primary shaft, acting on the other rod end in opposition to the disc spring, spring means being provided between the cover and clutch pressure plate, acting in opposition to the disc spring in order to remove the clutch pressure plate from the friction plate simultaneously with the rod displacement against the action of the disc spring.

The invention shall be described with reference to the accompanying drawings which show an embodiment thereof by way of example.

FIGURE 2 is a sectional view on line II—II of FIGURE 1;

FIGURE 3 is a sectional view on line III—III of FIGURE 2.

Figure 1:
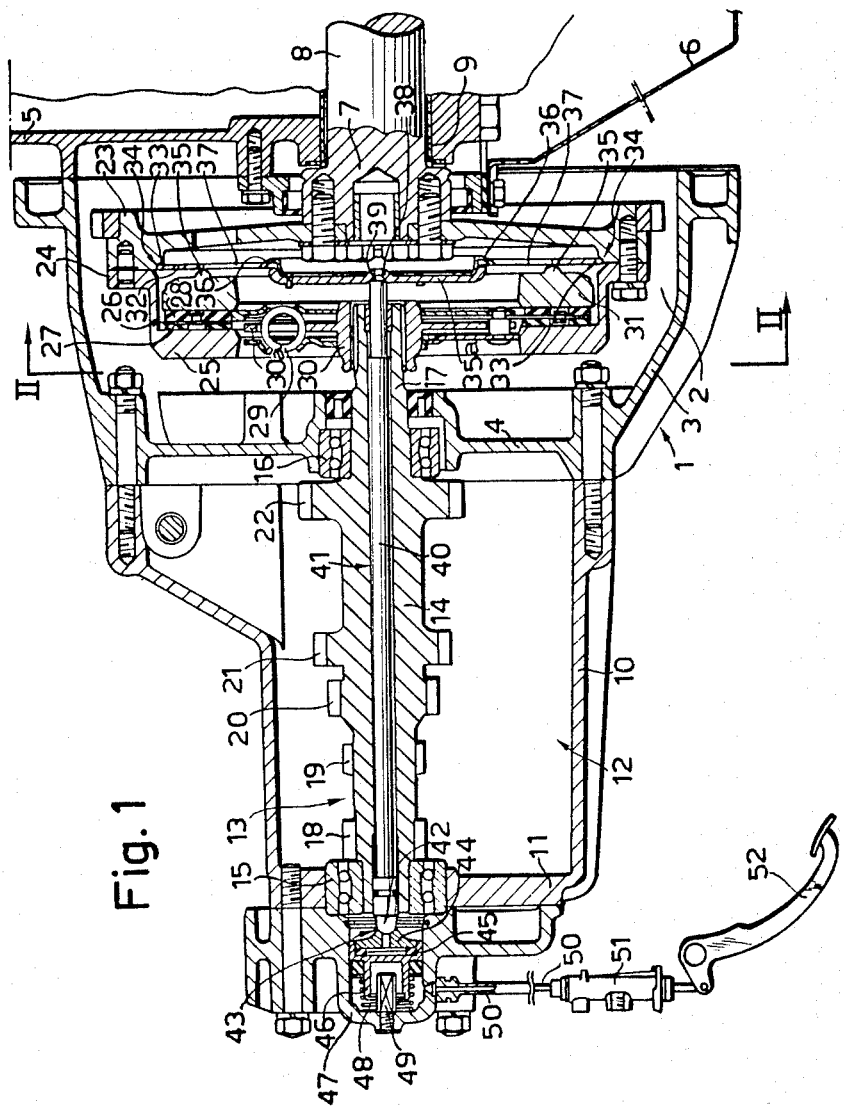
FIGURE 1 is an axial longitudinal sectional view of the clutch provided with a control according to this invention.

Referring to the figures, 1 denotes the friction clutch arranged in an enclosure 2 formed by a casing 3 provided with an end wall 4.

The casing 1 is rigidly secured to the engine crank case formed by a casing 5 provided with an oil sump 6. One end 7 of an engine shaft 8 mounted in a bearing 9 supported by the crank case 5 overhangs into the enclosure 2.

The wall 4 of the casing 3 has tightly and rigidly secured thereto a casing 10 having an end wall 11, forming a tightly-closed compartment enclosing a gearbox 13, the primary shaft 14 of which is mounted in bearings 15, 16 supported by the end walls 11, 14, respectively, axially aligned with the shaft 8.

The end 17 of the shaft 14 overhangs into the enclosure 2.

The gearbox 13 is described in detail in a co-pending application Serial Number 403,075 filed October 12, 1964 by applicant. The gearbox 13 is of the cascade type, wherein the primary shaft is provided with gears 18, 19, 20, 21, 22 securely fixed thereto and is adapted to be coupled with a secondary shaft (not shown) by respective gears freely mounted on the secondary shaft, the latter being permanently coupled with the power transmission to the vehicle driven wheels.

In such a gearbox the end of the primary shaft remote from the friction clutch is freely accessible, so that the control devices for the friction clutch can be arranged thereat, as described hereafter.

The friction clutch 1 is of known type comprising a flywheel 23 keyed to the end 7 of the engine shaft 8, having a cover 24 provided with an annular extension 25 spaced from and parallel with the flywheel 23.

A plate 26 is arranged in the clearance between the flywheel 23 and extension 25 and is provided on two faces with lining rings 27, 28 and a plurality of jerk-absorbing torque springs 29 radially arranged between the plate 26 and a radial extension 30a on a hub 30 axially slidable on the grooved end 17 of the shaft 14.

A clutch pressure plate 31 is juxtaposed to the plate 26 and is pressed against the latter by a disc spring 32 bearing by its circumferential edge 33 into a circular recess 34 in the flywheel 23 and by its middle portion on an annular projection 35 fast with the clutch pressure plate 31.

The disc spring 32 is provided with a middle opening covered by a pressure plate 35a secured to the spring 32 by means of a snap ring 36 engaged by radial grooves 37 in the spring.

The plate 35a is formed with a middle recess 38 receiving one end 39 of a rod 40 mounted for axial displacement in an axial bore 41 through the primary shaft 14.

The other end 42 of the rod 40 bears into a recess 43 formed in a disc 44 mounted for rotation through a thrust bearing 45 on a piston 46 of a hydraulic cylinder 47 coaxial with the rod 40 and secured to the end wall 11 of the casing 10.

The cylinder 47 comprises a compression spring 48 biassing the piston 46 to hold both ends 39, 42 of the rod 40 engaged by their respective recesses 38, 43.

The piston 46 is mounted for axial displacement on a prismatic guide 49 secured to the bottom of the cylinder 47.

The cylinder 47 connects by a conduit 50 with a cylinder of a hydraulic pump 51 operated by the vehicle driver by means of a pedal 52 for operation of the friction clutch 1.

In order to readily remove the friction plate 26 from the extension 25 on the flywheel cover, a plurality of flat springs 53 of an arcuated profile which is flattened on assembly, are secured between the flywheel cover 24 and clutch pressure plate 31.

As shown in FIGURE 3 one end of the spring 53 is riveted at 54 to the cover 24, the other end being secured by means of a bolt 55 in a notch 56 in the clutch pressure plate 31.

The force exerted by the springs 53 is smaller than the force of the disc spring 32; consequently, the springs 53 remove the clutch pressure plate 31 from the friction plate 26 only when the spring 32 is pushed back by the rod 40.

While the embodiment of the present invention as herein disclosed constitutes a preferred form, it is to be understood that other forms might be adopted.

What I claim is:

Control device for a friction clutch for motor vehicles equipped with a gearbox of the type having a primary shaft adapted to be coupled with an engine shaft through the said friction clutch, the friction clutch comprising a flywheel keyed to the engine shaft, provided with a cover secured to the said flywheel, a friction plate mounted for axial displacement on the primary shaft, juxtaposed to the cover, a clutch pressure plate juxtaposed to the friction plate, capable of axial displacement in the cover, a disc spring interposed between the flywheel and clutch pressure plate to press the latter against the friction plate and control means for de-clutching the friction plate comprising a rod mounted for axial displacement in an axial bore in the primary shaft and abutting by one end against the disc spring, the axial displacements of the rod being controlled by hydraulic cylinder means arranged externally of the primary shaft and acting on the other rod end against the disc spring, spring means being provided between the cover and clutch pressure plate and acting against the disc spring for removing the clutch pressure plate from the friction plate simultaneously with the displacement of the rod against the disc spring.

References Cited by the Examiner
UNITED STATES PATENTS

| | | |
|---|---|---|
| 2,229,319 | 1/1941 | Wesselhoff. |
| 2,725,964 | 12/1955 | Maurer. |
| 2,770,341 | 11/1956 | Wobrock _____ 192—89 X |
| 2,844,973 | 7/1958 | Hill _____ 192—96 |
| 3,130,828 | 4/1964 | Maurice _____ 192—89 X |
| 3,235,049 | 2/1966 | Hufstader _____ 192—89 |

DAVID J. WILLIAMOWSKY, *Primary Examiner.*

A. McKEON, *Assistant Examiner.*